United States Patent [19]

Haines et al.

[11] Patent Number: 5,077,660

[45] Date of Patent: Dec. 31, 1991

[54] REMOTE METER CONFIGURATION

[75] Inventors: John G. Haines, Oakland; Tracy F. Slaughter, Grass Valley; Charles P. Barker, Pleasanton, all of Calif.

[73] Assignee: f.m.e. Corporation, Hayward, Calif.

[21] Appl. No.: 328,112

[22] Filed: Mar. 23, 1989

[51] Int. Cl.[5] .................. G06F 15/20

[52] U.S. Cl. .................. 364/464.02

[58] Field of Search .................. 364/200, 464.02, 900

[56] References Cited

U.S. PATENT DOCUMENTS

| | | | |
|---|---|---|---|
| 3,034,329 | 5/1962 | Pitney et al. | 70/314 |
| 3,654,604 | 4/1972 | Crafton | 380/23 |
| 3,792,446 | 2/1974 | McFiggins et al. | 364/900 |
| 3,798,359 | 3/1974 | Feistel | 380/37 |
| 3,798,360 | 3/1974 | Feistel | 380/37 |
| 3,800,284 | 3/1974 | Zucker et al. | 340/825.31 |
| 3,860,911 | 1/1975 | Hinman et al. | 340/825.31 |
| 4,097,923 | 6/1978 | Eckert, Jr. et al. | 364/900 |
| 4,182,933 | 1/1980 | Rosenblum | 380/21 |
| 4,222,518 | 9/1980 | Simjian | 235/375 |
| 4,226,360 | 10/1980 | Simjian | 235/375 |
| 4,249,071 | 2/1981 | Simjian | 235/375 |
| 4,253,158 | 2/1981 | McFiggans | 364/900 |
| 4,280,180 | 7/1981 | Eckert et al. | 364/900 X |
| 4,302,821 | 11/1981 | Eckert et al. | 364/900 |
| 4,310,720 | 1/1982 | Check, Jr. | 364/900 X |
| 4,314,097 | 2/1982 | Campbell, Jr. | 235/380 X |
| 4,376,299 | 3/1983 | Rivest | 364/900 |
| 4,424,573 | 1/1984 | Eckert, Jr. et al. | 364/900 |
| 4,447,890 | 5/1984 | Duwel et al. | 364/900 |
| 4,481,604 | 11/1984 | Gilham et al. | 364/900 |
| 4,484,307 | 11/1984 | Quatse et al. | 364/900 |
| 4,528,644 | 7/1985 | Soderberg et al. | 364/900 |
| 4,562,535 | 12/1985 | Vincent et al. | 364/200 |
| 4,580,144 | 4/1986 | Calvi | 101/93.07 X |
| 4,636,975 | 1/1987 | Soderberg et al. | 364/900 |
| 4,775,246 | 10/1988 | Edelmann et al. | 380/23 |
| 4,775,931 | 10/1988 | Dickie et al. | 364/200 |
| 4,783,745 | 11/1988 | Brookner et al. | 364/464.02 |
| 4,787,045 | 11/1988 | Storace et al. | 364/464.02 |
| 4,812,992 | 3/1989 | Storace et al. | 364/464.02 |
| 4,812,994 | 3/1989 | Taylor et al. | 364/464.02 |
| 4,837,714 | 6/1989 | Brookner et al. | 364/550 |

FOREIGN PATENT DOCUMENTS 2636852 2/1978 Fed. Rep. of Germany .

*Primary Examiner*—Parshotam S. Lall
*Assistant Examiner*—Edward R. Cosimano
*Attorney, Agent, or Firm*—Townsend and Townsend

[57] ABSTRACT

A technique for reconfiguring in the field postage meters having a set of features that may be selectively enabled or disabled by software. The technique provides security so that the meter company will always have a correct record of the configuration of the meter in the field. The meter is capable of being put into a configuration mode by suitable entries from the keyboard, in which mode it is inhibited from printing postage. The meter has a storage register for a current or old meter type, and can receive a desired new meter type via keyboard entry. The meter generates an encrypted configuration request code that is partially based on the values of the old and new meter types. The configuration request code, when communicated to the data center computer along with other validating identification information, is checked by the data center computer which generates the configuration request code using the same algorithm. If the two values agree, the data center computer generates an encrypted configuration enable code. This is communicated to the meter, which receives the computer generated configuration enable code and also generates an internal configuration enable code using the same algorithm as the data center computer. If the configuration enable codes agree, the meter overwrites the old meter type number with the new meter type number, thereby reconfiguring the meter.

20 Claims, 7 Drawing Sheets

REMOTE METER CONFIGURATION

Related copending applications include: "REMOTE METER I/O CONFIGURATION", filed Mar. 23, 1989, Ser. No. 07/327,779; "SECURITY EXTENSION PROCEDURE FOR REMOTE SETTING METER", filed Mar. 23, 1989, Ser. No. 07/328,099; and "EMERGENCY POST OFFICE FOR REMOTE SETTING METER", filed Mar. 23, 1989, Ser. No. 07/327,487.

FIELD OF THE INVENTION

The present invention relates generally to postage meters and more particularly to electronic meters capable of being reconfigured.

BACKGROUND OF THE INVENTION

With the advent of electronic postage meters, it has become possible to offer meter customers a large number of optional features. Each additional feature, however, creates a larger number of possible combinations of features. Therefore, in order for a meter company to provide a large selection of features, it must maintain a large inventory of meters. This is costly and inefficient. In rental or lease markets, the inventory problem is increased by customer demands for a replacement meter of like features when the meter in service is damaged or fails.

A customer needing to replace the meter or wanting to change the features on his meter must wait for the agent of the meter company to obtain a meter having the desired set of features. If the agent does not have a large inventory, it becomes necessary to have a meter configured at the factory. Therefore, any attempts to reduce the number of meters in the pipeline will adversely affect the length of time necessary to service the customer's request.

SUMMARY OF THE INVENTION

The present invention provides a technique for securely reconfiguring postage meters in the field, thereby allowing variation of the features of the meter. The technique is readily implemented in the meter software. Because the technique provides security over the meter reconfiguration process, only authorized meter reconfigurations can occur. Therefore, the company will always have a correct record of the configuration of the meter in the field.

The technique assumes that the meter has a set of features that may be selectively enabled or disabled by software. The meter is capable of being put into a configuration mode by suitable entries from the keyboard, in which mode it is inhibited from printing postage. The meter has a storage register for a current or old meter type, and can receive a desired new meter type via keyboard entry. The meter has software for generating an encrypted configuration request code that is partially based on the values of the old and new meter types. The configuration request code, when communicated to a data center computer along with other validating identification information, is checked by the data center computer which computes the configuration request code using the same algorithm. If the two values agree, the data center computer generates an encrypted configuration enable code that is partially based on the meter serial number. This is communicated to the meter, which receives the meter generated configuration enable code and also generates an internal configuration enable code using the same algorithm as the data center computer. If the configuration enable codes agree, the meter overwrites the old meter type number with the new meter type number, thereby reconfiguring the meter.

A further understanding of the nature and advantages of the present invention can be realized by reference to the remaining portions of the specification and the attached drawings.

DETAILED DESCRIPTION OF THE SPECIFIC EMBODIMENTS

Meter Overview : Structure

Figure 1:
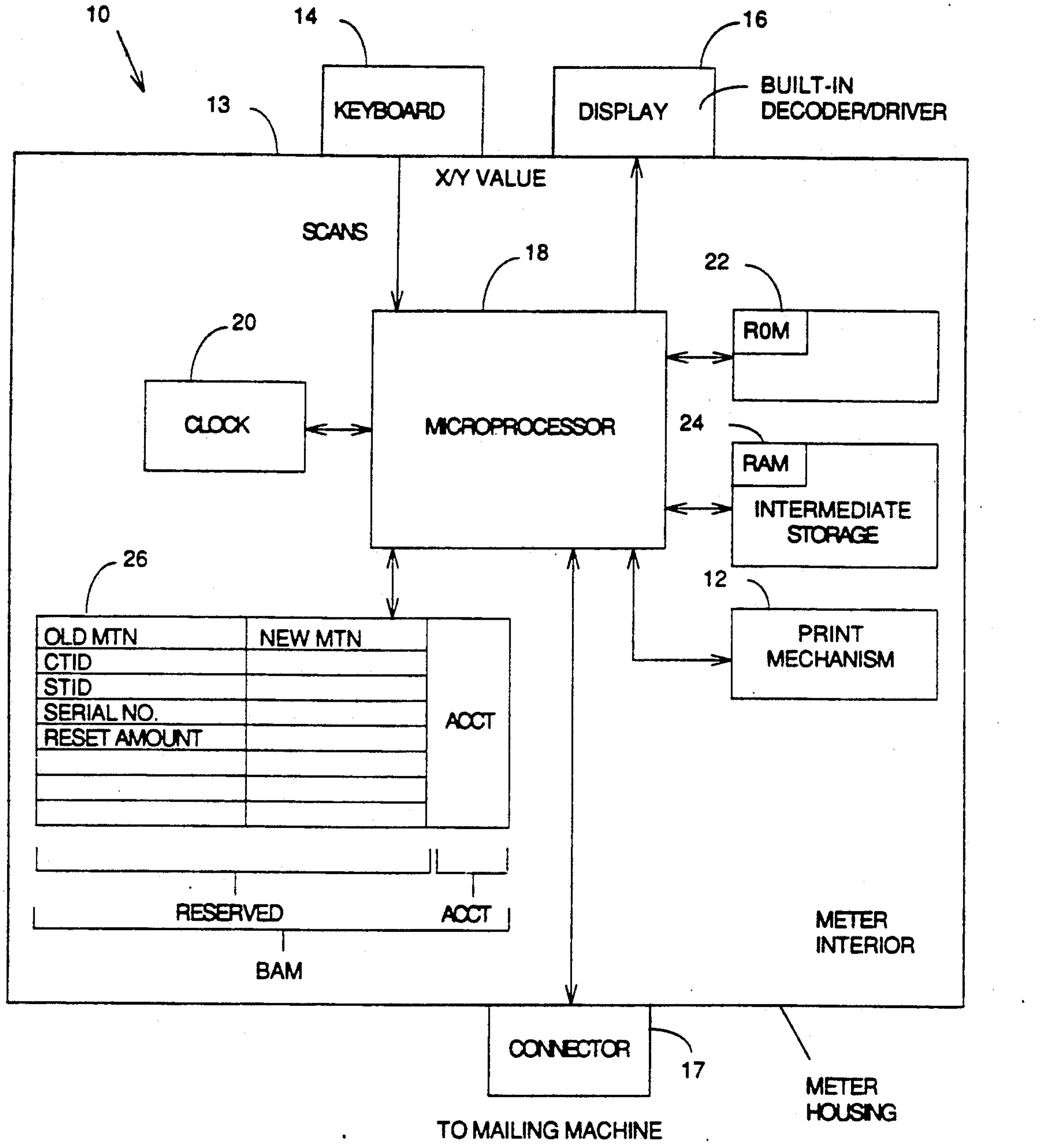
FIG. 1 is a block diagram of a preferred postage meter capable of being reconfigured in the field.

FIG. 1 is a block diagram of a preferred postage meter 10 that can be reconfigured in the field. Meter 10 includes a print mechanism 12, accounting registers, and control electronics, all enclosed within a secure meter housing 13. A keyboard 14 and a display 16 provide the user interface. A connector 17 provides an electrical connection with a mailing machine for control of the printing process. The control electronics includes a digital microprocessor 18 which controls the operation of the meter, including the basic functions of printing and accounting for postage, and optional features such as department accounting and remote setting. The microprocessor is connected to a clock 20, a read only memory (ROM) 22, a random access memory (RAM) 24, and a battery augmented memory (BAM) 26.

ROM 22 is primarily used for storing nonvolatile information such as software and data/function tables necessary to run the microprocessor. The ROM can only be changed at the factory. RAM 24 is used for intermediate storage of variables and other data during meter operation. BAM 26 is primarily used to store accounting information that must be kept when the meter is powered down. The BAM is also used for storing certain flags and other information that is necessary to the functioning of the microprocessor. Such information includes meter identifying data such as the meter serial number and BAM initialization date, and a number of parameters relevant to the remote configuration of the meter.

The meter is provided with a number of features that may be enabled or disabled by software. Representative features include department accounting (with various levels of sophistication and numbers of departments that can be tracked), set date prompt, low postage warning, calculator mode variable length security codes (see Appendix D for details), and remote setting. The remote setting feature is a capability of having the meter's postage amount increased without removing the meter from the customer site. In a first embodiment of the invention, the meter postage amount can be increased by a variable amount during the remote setting process. Alternatively, in a second embodiment of the invention, the meter postage amount can be increased by a fixed increment called the fixed remote setting amount. The fixed remote setting amount may then be varied during remote configuration of the meter. Additionally, the meter may have four print wheels (maximum postage $99.99), but the high order print wheel may be disabled (maximum postage $9.99).

In the first and second embodiments, certain meter features are hardware configured and cannot be set by software. This includes the print indicium (U.S. Postal Service or United Parcel Service) and the position of the decimal point (four-bank whole cents or four-bank decimal cents). These features may be software controlled and configurable in alternative embodiments of the invention.

Whether a feature or a feature set is enabled is controlled by a meter type number (MTN) representing the set of features enabled. The MTN is stored in BAM and is checked by the microprocessor during meter power-up and at some branch points in the software.

Meter Overview : Operation

In order to simplify the software and enhance microprocessor performance in the first and second embodiments, the microprocessor performs several initialization procedures during meter power-up. In some of the initialization procedures, the microprocessor uses the MTN stored in BAM to index in RAM the software code stored in ROM to tables also stored in ROM. This indexing allows the microprocessor to more quickly read the proper tables for information without having to repeatedly determine what table to read.

One indexed table is a Meter Selection Table which contains information regarding what features the meter has based upon the MTN and the type of meter (i.e. U.S. Postal Service or United Parcel Service, four-bank whole cents or four-bank decimal cents, etc.). Another indexed table is a Key Table which contains the address of the appropriate software code to be executed when a key is pressed by the user. The Key Table indexing is also partially based upon the MTN. After the initialization procedures are performed, the microprocessor waits for user input.

The microprocessor is able to determine user input by periodically scanning the keyboard. As a key is pressed, x and y coordinate values are determined by the microprocessor. The microprocessor converts the x and y coordinate values to an equivalent ASCII byte. The microprocessor sends the ASCII byte to the display, which contains its own internal decoder and driver for displaying the ASCII information to the user. The microprocessor then determines what software code in ROM to execute based upon the ASCII byte by reading the indexed Key Table in ROM.

The software code contains branch points where the microprocessor must read a table in ROM or a variable in BAM to determine which code to execute. For example, the microprocessor may read the indexed Meter Selection Table to determine whether the meter is configured to have a certain feature or not and thereby execute the appropriate code.

Upon the execution of the appropriate software code, the microprocessor returns to a scanning state as it waits for further user input.

Meter Relationship with the Data Center Computer

In the first and second embodiments, the meter is configured to a standard feature set before leaving the factory. Because the feature set is known, the meter can be functional and still does not need to be registered on the data center computer until it has been reconfigured a first time. In an alternative embodiments, the meter can be disabled state for security reasons until it has been reconfigured a first time.

During the reconfiguration process, the meter's serial number, present configuration and other information specific to the meter (which were already stored in the meter's memory during an initialization process at the factory) are entered on the data center computer. The meter and the computer are then able to generate identical encrypted codes by using the same encryption routine and input numbers. The encrypted codes help the data center computer maintain control over the feature set of each meter.

Two input numbers used by the meter and the computer to generate encrypted codes are the configuration transaction identifier ("CTID") and the setting transaction identifier ("STID"). They are both specific to the meter and dependent upon the meter serial number. They may also be incremented after each use. The CTID is normally used for reconfiguring the meter functions and the STID is normally used for remote setting the meter postage. Separate numbers are used for the separate procedures in order to maximize security and minimize complexity caused by interdependence. The encryption routine is described in greater detail below.

Meter Configuration Method

Figure 2:
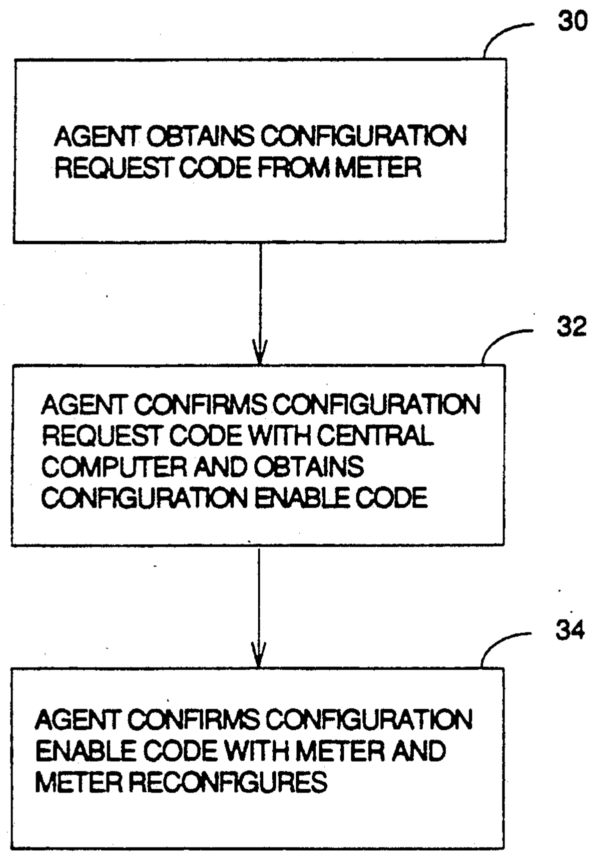
FIG. 2 is a high level flowchart of the process for reconfiguring the postage meter.

FIG. 2 is a high level flowchart of the process necessary for reconfiguring the postage meter by an agent at a customer's site or at the agent's technical service area. In a first stage 30, the agent obtains a configuration request code generated by the meter. This configuration request code is essentially a password to the data center computer, and is based upon a combination of factors, the combination of which only the data center computer would know. In a second stage 32, the agent confirms the configuration request code with the data center computer. Upon confirmation from the computer, the computer provides a configuration enable code back to the agent. The configuration enable code is essentially a password from the data center computer to the meter stating that it is permissible to reconfigure to the desired feature set. In a third stage 34, the agent enters the configuration enable code into the meter. The meter confirms the configuration enable code and reconfigures itself.

Figure 3:
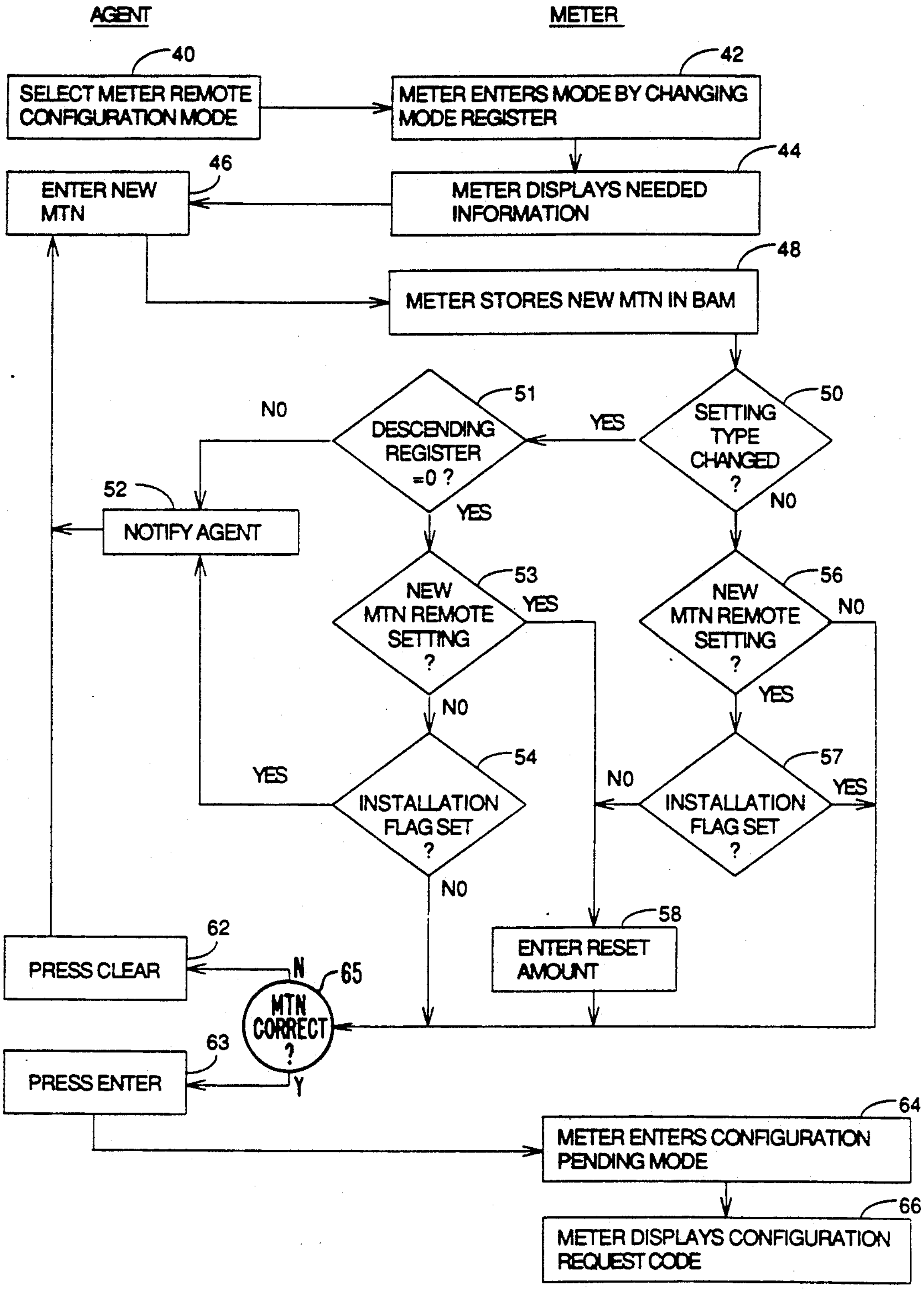
FIG. 3 is a detailed flowchart of the procedure for the agent to obtain a configuration request code generated by the meter in the second embodiment.

FIG. 3 is a detailed flowchart of stage 30 for the second embodiment. Some meters have displays that are sophisticated and allow for user prompting. Therefore, in each of the steps described below where the meter requires certain information in order to move to the next step, some meters may prompt the agent to make that step.

In a first step 40, the agent then puts the meter into a remote configuration mode by pressing a certain key sequence and entering a service access code. The key sequence is not obvious. This prevents customers and other unauthorized personnel from accidentally entering the configuration mode. The service access code is known to the agent and must be entered after completing the key sequence within a limited time interval that is checked by the microprocessor in combination with the clock. This further prevents customers and other unauthorized personnel from entering the configuration mode.

Upon entry of the predetermined key sequence and the agent access code, the meter enters the remote configuration mode by setting a mode register located in BAM (step 42). This prevents the meter from being used for printing purposes while being reconfigured.

The meter then displays the meter serial number, the meter BAM initialization date, and the old meter type number (old MTN) (step 44). The BAM initialization date is preferably a four digit number wherein the four digits YDDD express the date in which the meter was last initialized. The DDD stands for the number of days since December 31 and Y is the least significant digit of the year in which the meter was initialized. The old MTN is a number that defines the present feature set that the meter is presently configured to.

In the second embodiment, the meter also displays the Ascending Register amount or some other meter specific identifying information (step 44). The Ascending Register contains the amount of postage the meter has printed since the meter has been initialized.

The agent then enters the new MTN into the meter (step 46). This new number represents the set of features that the meter will have after reconfiguration. The agent must then press a selected key, such as the ENTER key, followed by the service access code within a limited time interval to indicate that the entered new MTN is correct and desired. If the entered new MTN is incorrect or not desired, the agent may let the timer expire or press another selected key such as a CLEAR key. The agent then enters the correct new MTN or exits the remote configuration mode. Once the correct new MTN is entered, the agent must press the selected key (i.e., ENTER) followed by the service access code within a limited time interval to indicate that it is the correct new MTN. The meter then stores the new MTN in BAM (step 48).

The meter then performs a series of tests to determine whether the meter is authorized to reconfigure to the new feature set represented by the new MTN. In the second embodiment, the meter also allows the agent to enter the fixed remote setting amount following the series of tests.

The meter compares the new MTN with the old MTN to determine whether the remote setting feature will be among those features changed by the adoption of the new MTN (step 50). If there will be such a change (either enabling a disabled remote setting feature or disabling an enabled remote setting feature), the meter determines if the amount in the descending register is equal to zero (step 51). If the amount in the descending register is not equal to zero, the meter rejects the attempted re-configuration and notifies the agent (step 52). If the amount in the descending register is zero, the meter determines whether the new MTN enables the remote setting feature (step 53). If the new MTN enables the remote setting feature, the meter prompts the agent to enter the reset amount by which postage will be increased through use of the remote setting feature (step 58). If the new MTN does not enable the remote setting feature, i.e., the output of decision box 53 is "no", the meter determines if the installation flag has been set (step 54). A set installation flag indicates that the meter has been "installed" in accordance with the procedures described in Appendix A and is linked with the post office in the central data computer. The enablement status of the remote setting feature may not be changed in a meter so installed. If the installation flag is set, the proposed reconfiguration is rejected and the agent so notified (step 52). If the installation flag is not set, the meter displays the new MTN for agent confirmation (step 65).

If, however, the meter determines, at step 50, that the new MTN will not change the enablement status of the remote setting feature, the meter next determines whether this status is enabled (step 56). If it is, the meter determines if the installation flag is set (step 57). If the installation flag is not set, the meter permits the agent to change the reset amount as part of the re-configuration. The meter prompts the agent to enter the reset amount to be associated with the remote setting feature. If, however, the installation flag is set (step 57), or the new MTN does not enable the remote setting feature (step 56), the meter omits step 58 and displays the new MTN for agent confirmation (step 65).

If the agent wants to start the process again with a new MTN, then the agent must press a selected key such as the CLEAR key (step 62). If the agent wants to continue, then the agent must press a selected key, such as the ENTER key, followed by the service access code or some other confirmation code (step 63). At this point, the meter puts the meter in a configuration pending mode by setting a meter configuration flag located in BAM (step 64) Once in the configuration pending mode, the meter must be reconfigured properly or else it will not return to the print mode. This prevents tampering with the reconfiguring of the meter. The meter remains in this mode even when the meter is turned off and then turned back on.

The meter then generates and displays an encrypted meter configuration request code (step 66). In the second embodiment, the configuration request code is partially based on the Ascending Register amount or some other meter identifying register, the old MTN, the new MTN, and the remote setting amount. The encryption process for the first and second embodiments is described in further detail below.

Figure 4:
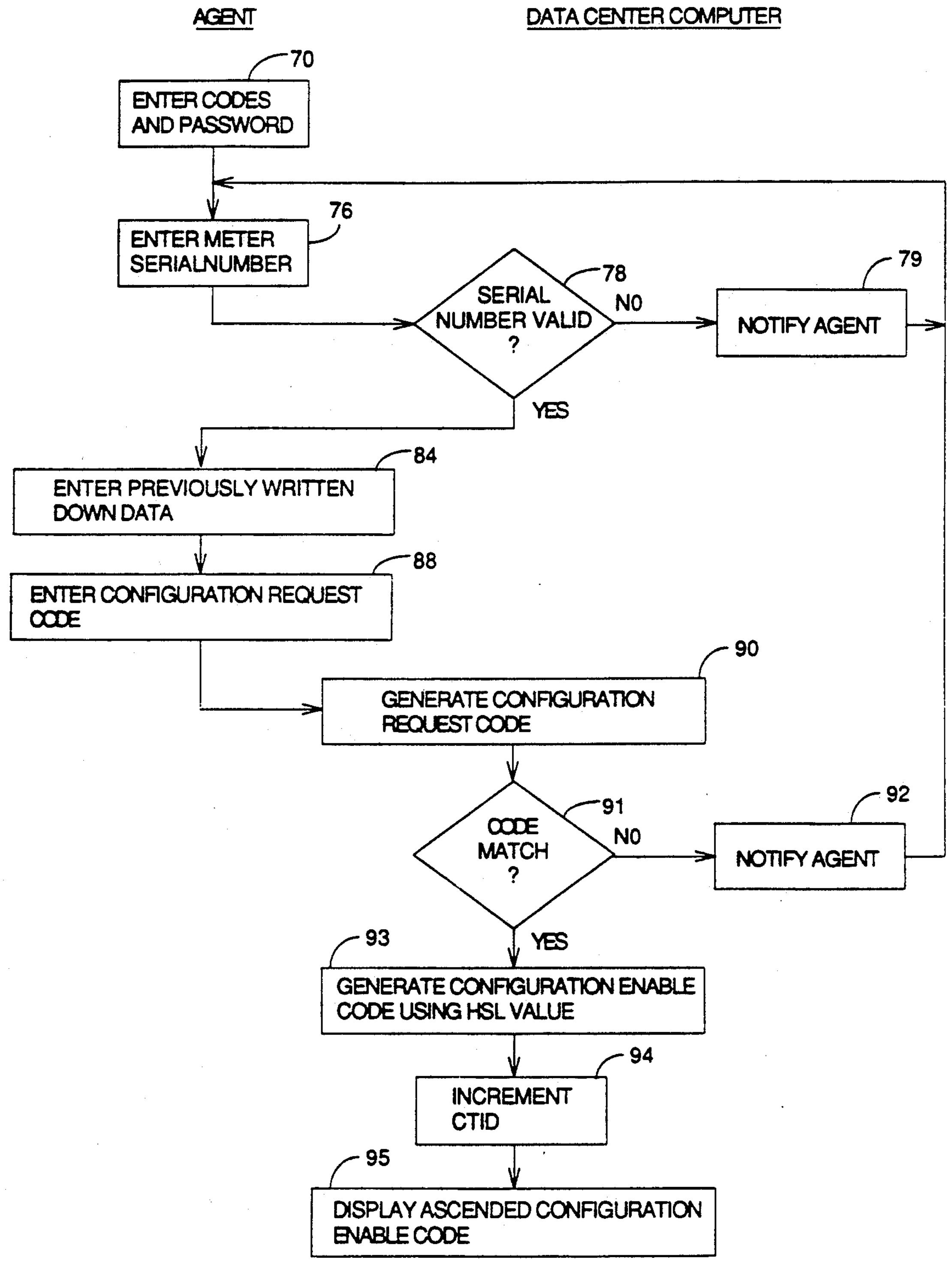
FIG. 4 is a detailed flowchart of the procedure for the agent to confirm the configuration request code with the data center computer.

FIG. 4 is a flowchart of stage 32 as shown in FIG. 2 for the first and second embodiments. The agent establishes communication with the data center computer over a standard telephone. In the first and second embodiments, the agent may communicate with the data center computer on a touch tone telephone by pressing the keys. Alternative embodiments may utilize a telephone communications device that includes a user or meter interface and a modem, or by voice recognition over a telephone.

The agent first enters various codes and a password to the computer (step 70). These include a transaction code (which describes that the agent is attempting to do a remote configuration for a meter) his employee number, and his authorization code (which is a password to the data center computer for that employee).

The agent then enters the meter serial number which was previously displayed by the meter but can also be found on the exterior of the meter (step 76). If the data center computer determines that the serial number is within a valid range (step 78), then the user may continue. Otherwise, the computer will notify the agent that the serial number is not within a valid range (step 79) and the agent must reenter the serial number or terminate the transaction.

The agent then enters data previously obtained in step 44 and written down above (step 84). In the first embodiment, this includes the BAM initialization date, the old MTN and the new MTN. In the second embodiment, this includes the BAM initialization date, the old MTN, the new MTN, the Ascending Register amount, and the remote setting amount.

The agent then enters the configuration request code from the meter (step 88). From the information above, the computer is also able to generate a configuration request code (step 90). The computer checks that its configuration request code matches the configuration request code generated by the meter (step 91). If they do not match, then the agent has improperly entered numbers, the meter has been improperly reconfigured, or some other error has occurred. If the codes do not match, then the agent is notified (step 92) and must repeat the above steps starting with entering the meter serial number (step 76) or terminate the transaction.

If the two codes match, then the computer generates an encrypted configuration enable code using the current high security length (HSL) value (step 93). The data center computer or other CTID counter then increments the CTID located within the computer (step 94). The HSL value is a level of security presently utilized by the meter and data center computer which affects the length of codes passed between the meter and the data center computer (see encryption routine and Appendix D for details). The computer appends the HSL value to the configuration enable code and conveys the appended code to the agent (step 95).

Figure 5:
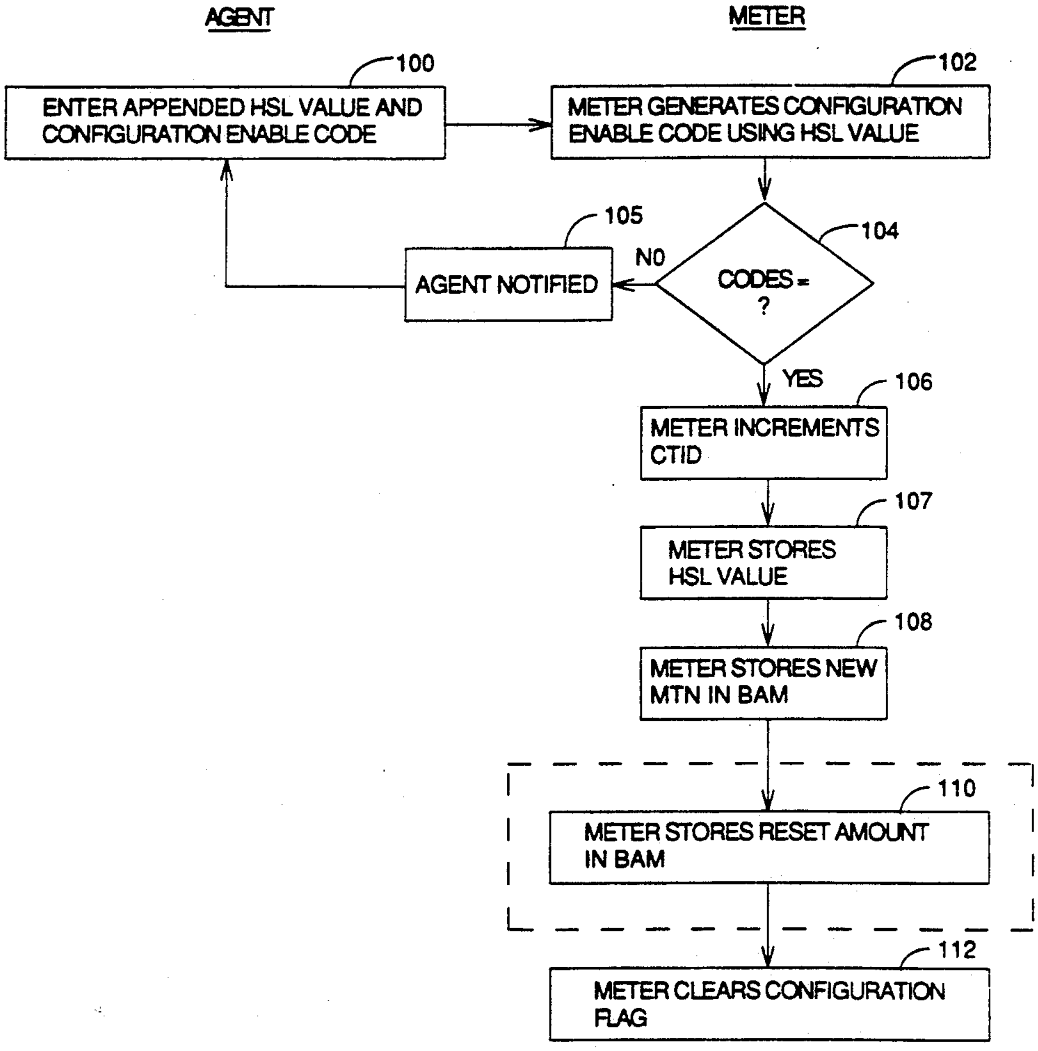
FIG. 5 is a detailed flowchart of the procedure for the agent to enter the configuration enable code into the meter.

FIG. 5 is a flowchart of stage 34 shown above in FIG. 2. The agent enters the appended computer generated HSL value and configuration enable code into the meter (step 100). The meter then generates its own configuration enable code using the appended HSL value (step 102) and compares that code with the entered configuration enable code (step 104). If the codes do not agree, then the agent is notified (step 105) and the agent reenters the computer generated code. If the configuration enable codes agree, then the meter knows that it is authorized to reconfigure. The meter then increments the CTID (step 106). The meter stores the new HSL value and the MTN in the HSL value location and the meter type number location in BAM (steps 107, 108). In the second embodiment, the meter also stores the five-digit remote setting amount in the remote setting amount location BAM if it was entered (step 110). The meter then clears the configuration flag (step 112), thereby allowing the meter to return from the configuration pending mode to the print mode.

Alternative Meter

Figure 6:
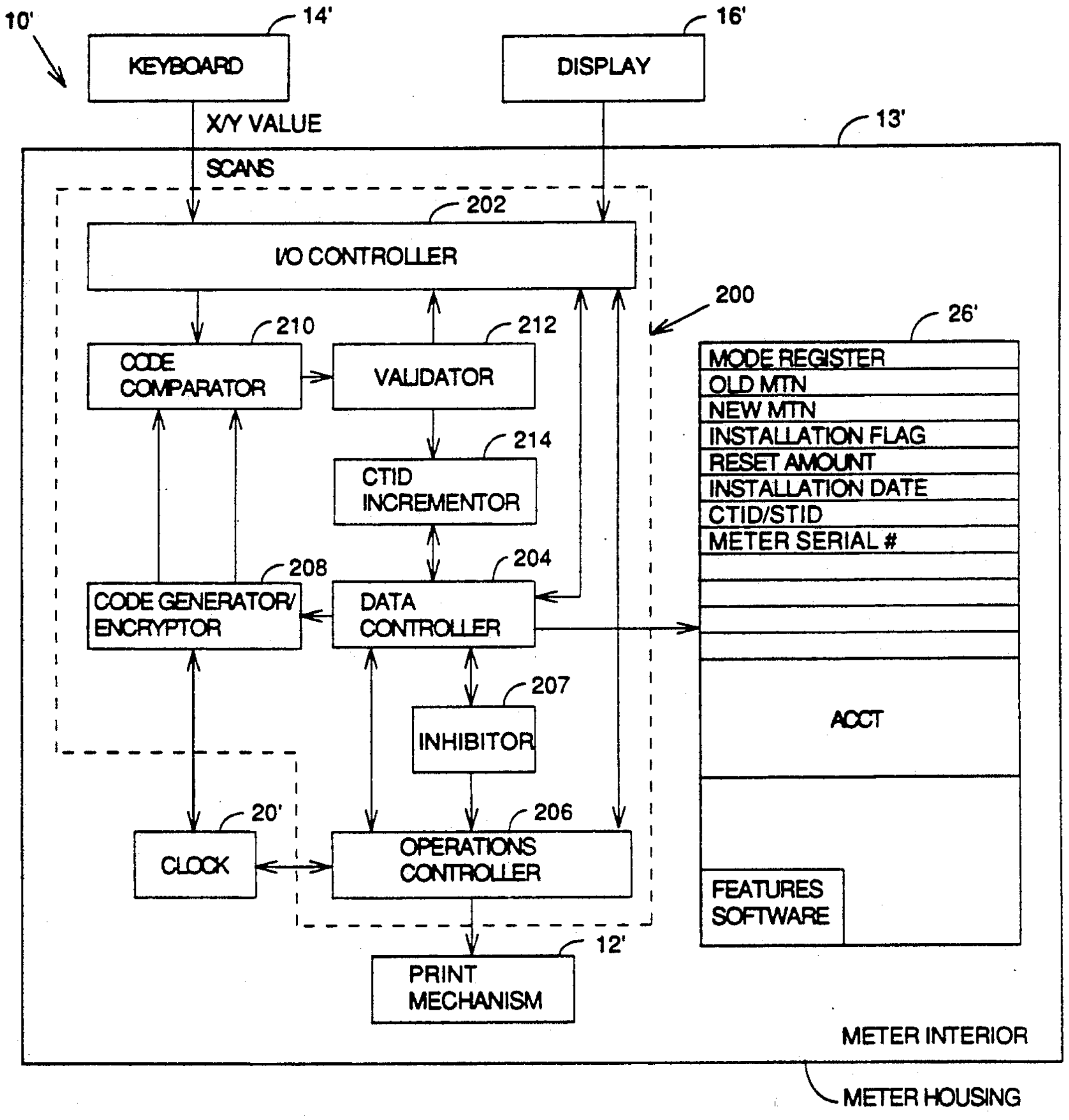
FIG. 6 is a block diagram of an alternative postage meter capable of being reconfigured in the field.

FIG. 6 is a block diagram of an alternative postage meter capable of being reconfigured in the field. Primed reference numerals are used for blocks that correspond to those in FIG. 1.

Meter 10' includes an external keyboard 14' and a display 16' to provide for user interface with the meter. A secure meter housing 13' encloses a print mechanism 12', clock 20', registers or flip-flops 26', and control circuitry 200. The control circuitry includes several controllers and other hard-wired circuits in lieu of a microprocessor as shown in FIG. 1.

The control circuitry includes an I/O controller 202 which performs as an interface between the rest of the control circuitry and the keyboard and display. A data controller 204 performs as an interface between the registers and the rest of the control circuitry. An operations controller 206 controls the operations of the meter by executing the feature software stored in the registers. The operations controller knows which features to execute by checking the new MTN register stored in BAM. An inhibitor 207 checks the mode register stored in the registers to determine whether operations of the meter should be inhibited.

A code generator/encryptor 208 continuously checks various registers in the registers and generates two encrypted codes based upon those registers. A code comparator 210 compares the generated codes with entered codes from the keyboard whenever such codes are entered (such as during a reconfiguration procedure). Upon a favorable comparison, the code comparator notifies a validator 212. The validator then gives a valid message through the I/O controller to the display and will instruct a CTID incrementor 214 to increment the CTID stored in the registers.

Figure 7:
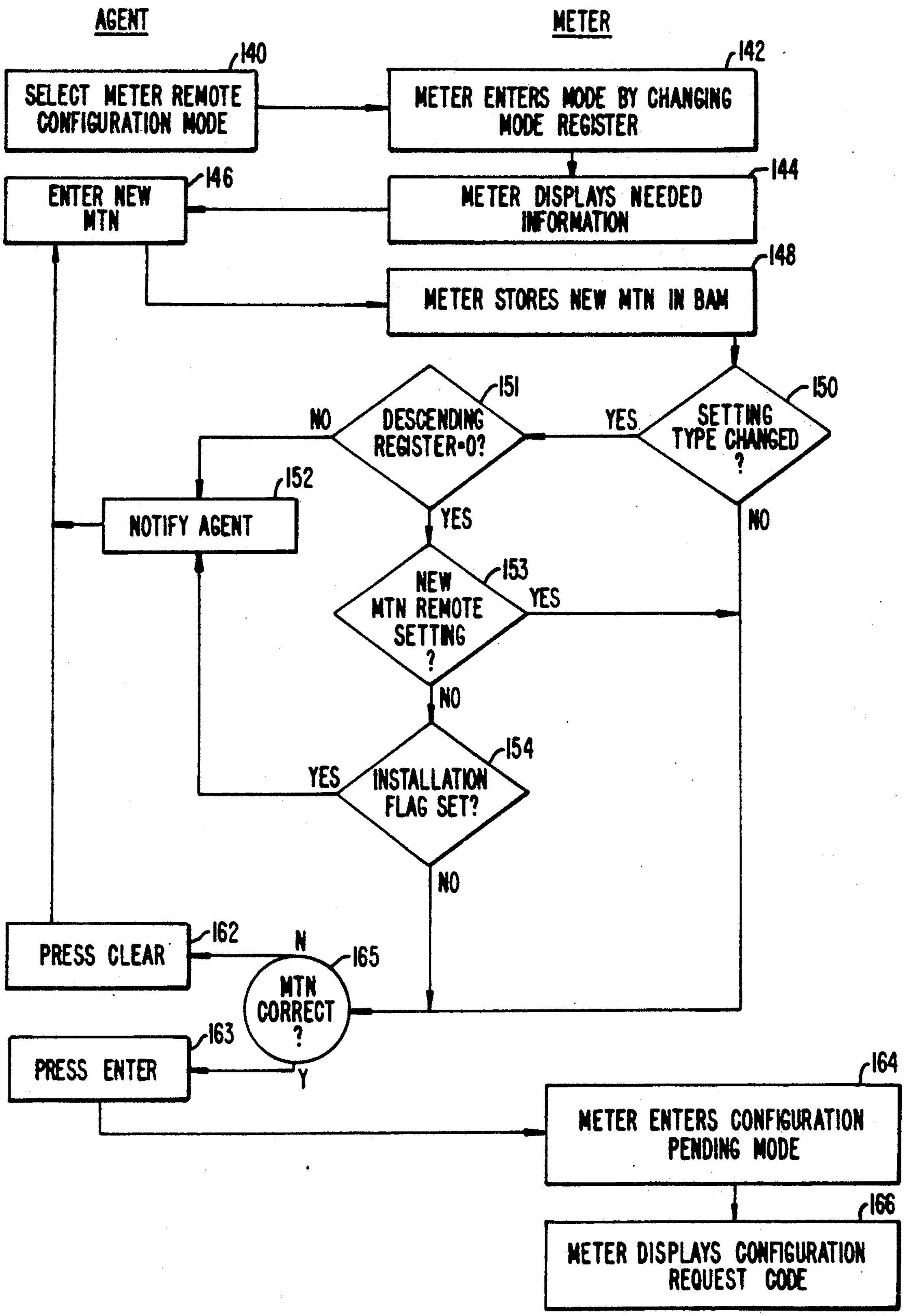
FIG. 7 is a detailed flowchart of the procedure for the agent to obtain a configuration request code generated by the meter in the first embodiment.

FIG. 7 is a detailed flowchart of stage 30 for the first embodiment. Some meters have displays that are sophisticated and allow for user prompting. Therefore, in each of the steps described below where the meter requires certain information in order to move to the next step, some meters may prompt the agent to make that step.

In a first step 140, the agent puts the meter into a remote configuration mode by pressing a certain key sequence and entering a service access code. The key sequence is not obvious. This prevents customers and other unauthorized personnel from accidentally entering the configuration mode. The service access code is known to the agent and must be entered after completing the key sequence within a limited time interval that is checked by the microprocessor in combination with the clock. This further prevents customers and other unauthorized personnel from entering the configuration mode.

Upon entry of the predetermined key sequence and the agent access code, the meter enters the remote configuration mode by setting a mode register located in BAM (step 142). This prevents the meter from being used for printing purposes while being reconfigured.

The meter then displays the meter serial number, the meter BAM initialization data, and the old meter type number (old MTN) (step 144). The BAM initialization data is preferably a four digit number wherein the four digits YDDD express the data in which the meter was last initialized. The DDD stands for the number of days since Dec. 31 and Y is the least significant digit of the year in which the meter was initialized. The old MTN is a number that defines the present feature set that the meter is presently configured to.

The agent then enters the new MTN into the meter (step 146). This new number represents the set of features that the meter will have after reconfiguration. The agent must then press a selected key, such as the enter key, followed by the service access code within a limited time interval to indicate that the entered new MTN is correct and desired. If the entered new MTN is incorrect or not desired, the agent may let the timer expire or press another selected key such as a CLEAR key. The agent then enters the correct new MTN or exits the remote configuration mode. Once the correct new MTN is entered, the agent must press the selected key (i.e., ENTER) followed by the service access code within a limited time interval to indicate that it is the correct new MTN. The meter then stores the new MTN in BAM (step 148). The meter then performs a series of tests to determine whether the meter is authorized to reconfigure to the new feature set represented by the new MTN.

The meter then compares the new MTN with the old MTN to determine whether the remote setting feature will be among those features changed by the adoption of the new MTN (step 150). If there will be such a change (either enabling a disabled remote setting feature or disabling an enabled remote setting feature), the meter determines if the amount in the descending register is equal to zero (step 151). If the amount in the descending register is not equal to zero, the meter rejects the attempted reconfiguration and notifies the agent (step 152). If the amount in the descending register is zero, the meter determines whether the new MTN enables the remote setting feature (step 153). If the new MTN enables the remote setting feature, the meter displays the new MTN for agent confirmation (step 165). If the new MTN does not enable the remote setting feature, i.e., the output of decision box 153 is "no", the meter determines if the installation flag has been set (step 154). A set installation flag indicates that the meter has been "installed" in accordance with the procedures described in Appendix A and is linked with the post office in the central data computer. The enablement status of the remote setting feature may not be changed in a meter so installed. If the installation flag is set, the proposed reconfiguration is rejected and the agent so notified (step 152). If the installation flag is not set, the meter displays the new MTN for agent confirmation (step 165).

If, however, the meter determines, at step 150, that the new MTN will not change the enablement status of the remote setting feature, it is unnecessary to determine if the meter is installed (since in this embodiment there is no reset amount to be changed). The meter then displays the new MTN for agent confirmation (step 165). If the agent wants to start the process again with a new MTN, then the agent must press a selected key such as the CLEAR key (step 162). If the agent wants to continue, then the agent must press a selected key, such as the ENTER key, followed by the service access code or some other confirmation code (step 163). At this point, the meter puts the meter in a configuration pending mode by setting a meter configuration flag located in BAM (step 164). Once in the configuration pending mode, the meter must be reconfigurated properly or else it will not return to the print mode. This prevents tampering with the reconfiguring of the meter. The meter remains in this mode even when the meter is turned off and then turned back on.

The meter then generates and displays an encrypted meter configuration request code (step 166). The configuration request code is partially based on the CTID, the old MTN, and the new MTN.

Encryption Technique

In order to perform the above procedure in a secure manner and to confirm certain data, the configuration request code and the configuration enable code are generated by an encryption routine, stored both in the meter ROM and in the data center computer. The encryption routine is a nonlinear algorithm that generates a number that is apparently random to an outside person. The encryption routine is performed by an encryption program in combination with a permanent encryption table. In the first and second embodiments, the encryption routine uses a 16 digit (or 64 bit) key and a 16 digit input number.

In the first embodiment, the configuration request code is generated by the encryption routine performed on the CTID as the key and a combination of the old MTN and the new MTN as the input number. In the second embodiment, the key is composed of the meter serial number and the BAM initialization date and the input number is composed of the old MTN, the Ascending Register amount and the new MTN, and the remote setting amount.

In the first embodiment, the configuration enable code is generated by the encryption routine performed on the CTID as the key and a combination of the old MTN, new MTN, and HSL value as the input number. In the second embodiment, the configuration enable code is generated by the encryption routine performed on the CTID as the key and a combination of the meter serial number and the HSL value as the input number.

The CTID is a 16 digit number that is stored in BAM. The initial value of the CTID is obtained by performing an algorithm upon the BAM initialization date in combination with the meter serial number. The BAM initialization date is used to prevent starting with the same CTID every time the meter is initialized. The algorithm is not stored in the meter for security reasons. The initial CTID is stored in BAM during the initialization process at the factory. After the meter is reconfigured, the CTID is incremented by a nonlinear algorithm within the meter.

The codes generated by the encryption routine are 16-digits long. The lower digits of the codes are then communicated to the agent by the meter or the data center computer. The number of lower digits that are communicated is determined by the HSL value (see Appendix D for details).

Conclusion

It can be seen that the present invention provides a secure and efficient technique for allowing meters to be reconfigured in the field. The meter customer has the option of selecting features while the meter company is spared the burden of maintaining a huge inventory that would otherwise be necessary.

While the above is a complete description of specific embodiments of the invention, various modifications, alternative constructions, and equivalents may be used. For example, the electronics of the configurable meter may be structured differently. Additionally, instead of using the tones on the telephone, a direct connection via modem can be used. Furthermore, the encryption key used to generate the request codes could be composed of a meter cycle counter instead of the meter serial number. Other security measures may be implemented such as requiring periodic inspection of the meter.

Therefore, the above description and illustration should not be taken as limiting the scope of the present invention, which is defined by the appended claims.

APPENDIX A

Installation Procedure

This procedure is performed by an agent when installing a remote setting meter at a customer's site.

Prior to this procedure, the meter must have been reconfigured at least once since being initialized in order to establish a first link between the meter and the data center computer. In addition, the meter must be configured to include the remote setting feature. Furthermore, the meter cannot print postage until it has been installed.

This procedure establishes a second link between the meter, the customer, and a lease on the data center computer for accounting, billing, and security purposes. This procedure also ensures that the meter has been logged into service at the post office.

Meter at the Post Office

After reconfiguring the meter, the agent or the customer takes the meter to the Post Office to register it. Once registered, the Post Office Clerk inserts a special key in the side of the meter enabling it to be installed.

Agent at the Customer Site with the Meter

Upon arriving at a customer site with the Post Office enabled meter to be installed, the agent presses a selected key sequence to put the meter in an installation mode. The meter then displays in sequence several numbers which the agent should write down for later use in this procedure. The meter first displays the amount stored in two of the accounting registers, the Descending Register and the Control Register. The Descending Register contains the amount of postage the meter presently has for printing postage. The Ascending Register contains the amount of postage the meter has been credited since the meter left the factory. The Control Register contains the sum of the Descending and Ascending Register amounts. The meter then displays an Installation Registration Code (IRC). The IRC is also an encrypted number dependent upon meter specific data and may include the STID. The meter then prompts for an encrypted Installation Setting Code (ISC) which is dependent upon the STID.

Agent with the Data Center Computer

The agent then contacts the data center computer and enters a standard installation request code, thereby notifying the computer that the agent is in the process of performing an installation procedure. The agent then enters the agent's number, the agent's authorization code, the number of the customer lease for the meter, the serial number of the meter to be installed and other similar numbers. The computer tests the serial number for validity. If the serial number is invalid, the agent should recheck and reenter the serial number or terminate the transaction.

If the serial number is valid, the agent enters the Descending Register amount, the Control Register amount, and the IRC. The computer then internally generates the IRC and compares it with the meter generated IRC. If the codes are unequal for any reason, then the agent should repeat the above process beginning with entering the serial number of the meter to be installed.

The data center computer generates and communicates the ISC, which the meter has prompted for, and increments the STID. The computer then internally flags that the meter is installed at the customer site.

Agent at the Meter

The agent returns to the meter and enters the computer generated ISC. The meter then internally generates an ISC and compares it with the entered installation code. If the codes are not equal, the meter will not accept the code. The agent may then obtain the current ISC from the data center computer again. Unlimited retries are permitted. If the codes are equal, the meter then increments the STID and sets an installation flag in BAM thereby allowing the meter to be remotely set and to print postage.

APPENDIX B

Withdrawal Procedure

This procedure is performed by an agent when withdrawing a remote setting meter from a customer site. This procedure removes the second link between the meter, the customer and the lease on the data center computer. In addition, this procedure prevents the meter from being remotely set. Furthermore, this procedure allows the meter to be reconfigured to change the fixed reset amount, or to a non-remote setting meter, installed at another customer site, or returned to the factory.

Agent with the Data Center Computer

The agent contacts the data center computer and enters a standard withdrawal request code, thereby notifying the central computer that the agent is in the process of performing a withdrawal procedure. The agent then enters the agents number, the agent's authorization code, and the serial number of the meter and other data to be withdrawn. The data center computer tests the serial number for validity. If the serial number is invalid, the agent should recheck and reenter the serial number. If the serial number continues to be invalid, then the meter is not properly registered on the central computer and the agent should contact the factory for further instructions.

If the serial number is valid, the agent enters a reason code. The reason code is a alphanumeric value which represents the reason why the meter is being withdrawn. The data center computer then internally generates an encrypted Withdrawal Setting Code (WSC). The data center computer then flags the meter as being withdrawn and increments the meter STID.

Agent at the Meter

If the meter is not functional, the agent returns the meter to the factory. If the meter is functioning then the agent presses a selected key sequence to put the meter in a withdrawal mode. The agent then enters the computer generated WSC into the meter. The meter then internally generates the WSC and compares it with the computer generated WSC. If the codes are not equal, the meter will display an error message and the agent reenters the computer generated WSC. Unlimited retries are permitted. If the codes are equal, the meter then increments the STID and clears the installation flag in BAM.

Meter at the Post Office

After withdrawing the meter, the agent or customer takes the meter to the Post Office to close the registration previously performed in the Installation Procedure (see Appendix A). Once the registration is closed, the Post Office Clerk inserts a special key in the side of the meter thereby completing the Withdrawal Procedure.

APPENDIX C

Exchange Procedure

This procedure is performed by an agent when replacing a meter at a customer's site with another meter. This procedure is merely a combination of the withdrawal of the old meter and installation of the new meter at the customer site. Each of the steps for the meters are the same as described in the Installation and Withdrawal Procedures (see Appendices A and B) except the agent is able to perform the procedures with only a single communication with the computer.

APPENDIX D

Variable Length Security Codes

An algorithm is used to generate an apparently random code with multiple digits. However, only a selected number of digits (usually the lower digits) of this code needs to be used in most applications. The number of digits needed depends upon the level of security needed. It is preferred to use as few digits as possible to decrease the number of keystrokes that must be entered, thereby increasing convenience and decreasing the potential for error.

As a result, a variable has been created which defines the overall level of security required by the meter or data center computer. This variable is called the high security length (HSL) value.

Each code generated by the meter or data center computer has a variable length of digits used depending upon the HSL value. That is, if the HSL value is 1, then the configuration request code should have 6 digits. If the HSL value is higher, then the configuration request code should be longer. Other codes may have different lengths for a given HSL value, but each code will increase or decrease in length if the HSL value is increased or decreased.

This predetermined relationship between code length and the HSL value allows the meter manufacturer to increase or decrease security for the meter without having to recover and initialize each meter. Changes in the HSL value are communicated to the meter when performing a remote meter configuration.

In an alternative embodiment, multiple security variables may be used to vary the lengths of individual or groups of codes without affecting the length of the remaining codes.

What is claimed is:

1. A method of selectively enabling software controllable features of an electronic postage meter, the meter having identifying data stored therein, being remote from a data center computer, and having a first mode of operation wherein the meter can print postage and be used with the enabled features and a second mode of operation for enabling selected controllable features, the method comprising the steps of:

a) placing the meter in the second mode;
b) entering into the meter a new type number representing a desired feature set to be enabled;
c) calculating at the meter a meter generated configuration enable code that depends on the identifying data and the new type number;
d) establishing communication with the data center computer;
e) entering into the data center computer the identifying data and the new type number;
f) calculating at the data center computer a computer generated configuration enable code that depends on the identifying data and the new type number;
g) entering the computer generated configuration enable code into the meter;
h) comparing at the meter the meter generated configuration enable code and the computer generated configuration enable code;
i) placing the meter in the first mode if the meter generated and computer generated configuration enable codes agree; and
j) causing the meter to enable the desired feature set if the meter generated and computer generated configuration enable codes agree.

2. The method of claim 1, and further comprising the steps of:

k) calculating at the meter a meter generated configuration request code, said calculation being performed between steps b) and f) of claim one;
l) entering the meter generated configuration request code into the data center computer, said entry being performed between steps d) and f) of claim one;
m) calculating at the data center computer a computer generated configuration request code, said calculation being performed between steps d) and f) of claim one; and
n) comparing at the data center computer the meter generated and computer generated configuration request codes, said comparison being performed between steps d) and f) of claim one.

3. An electronic postage meter having a plurality of software features that may be enabled, the postage meter comprising:

a) first register means for storing a first number representative of a current feature set;
b) means, responsive to the content of the first register means, for selectively enabling the feature set represented by the content of the first register means;
c) second register means for storing an entered second number representative of a desired new feature set;
d) means for generating an internal configuration enable code that depends on at least one of the first and second numbers;
e) means for entering an externally generated configuration enable code;
f) means for comparing the internally generated configuration enable code with the entered configuration enable code; and
g) means for placing the second number in the first register means when the internally generated and entered configuration enable codes are the same.

4. The meter of claim 3 wherein said configuration enable code depends on both the first and second numbers.

5. The meter of claim 3, and further comprising means for generating and displaying a configuration request code that depends on at least one of the first and second numbers.

6. The meter of claim 3 wherein the configuration enable code is encrypted.

7. An electronic postage meter having a plurality of software features that may be enabled, the postage meter comprising:

a) first register means for storing a first number representative of a current feature set;

b) second register means for storing an entered second number representative of a desired new feature set;

c) first means for entering an externally generated configuration enable code; and d) second means for:

i) selectively enabling the current feature set represented by the content of the first register means in response to the content of the first register means;

ii) generating an internal configuration enable code that depends on at least one of the first and second numbers;

iii) comparing the internally generated configuration enable code with the entered configuration enable code; and iv) placing the second number in the first register means when the internally generated and entered configuration enable codes are the same.

8. The meter of claim 7 wherein the reconfiguration code depends on both the first and second numbers.

9. The meter of claim 7 wherein the second means is further for generating and displaying a configuration request code that depends on at least one of the first and second numbers, said configuration request code generation and display occurring between steps i) and ii) of said second means.

10. The meter of claim 7 wherein the configuration enable code is encrypted.

11. The meter of claim 7 wherein the second means is a programmed digital microprocessor.

12. An electronic postage meter having a number of software controllable features, comprising:

a) a mode register having at least first and second modes;

b) means, responsive to the state of the mode register, for inhibiting normal meter operations;

c) a first MTN register for storing an old meter type number representative of a current feature set of the meter;

d) means, responsive to the content of said first MTN register, for selectively enabling the current feature set represented by the content of the first MTN register when the mode register is in the first mode;

e) means, responsive to a particular first data entry, for setting the mode register to the second mode;

f) a second MTN register for storing a new meter type number representative of a desired new feature set;

g) means, responsive to a second data entry representing the desired new feature set, for placing the new meter type number in the second MTN register;

h) means for calculating an encrypted internally generated configuration request code whose value depends on the old and new meter type numbers;

i) means for calculating an encrypted internally generated configuration enable code whose value depends in a different way than on the configuration request code old and new meter type numbers;

j)means, responsive to a third data entry representing an externally generated configuration enable code, for comparing the internally generated and externally generated configuration enable codes; and k) validation means, responsive to a predetermined relationship between the internally generated and externally generated configuration enable codes for storing the new meter type number in the first MTN register, the validation means acting further to set the mode register to the first mode.

13. The meter of claim 12 further comprising:

l) a CTID counter; and m) means for incrementing the content of the CTID counter each time the validation means determines the existence of the predetermined relationship.

14. The meter of claim 13 wherein the encrypted configuration enable code is partially dependent upon the CTID.

15. The meter of claim 13 wherein the encrypted configuration request code is partially dependent upon the CTID.

16. The meter of claim 13 wherein the encrypted configuration request code is not dependent upon the CTID.

17. An electronic postage meter having a number of software controllable features, comprising:

a) a mode register having at least first and second modes;

b) a first MTN register for storing an old meter type number representative of a current feature set of the meter;

c) a second MTN register for storing a new meter type number representative of a desired new feature set; and d) means for:

i) allowing normal meter operations in response to the first mode of said mode register;

ii) inhibiting normal meter operations and allowing reconfiguration of the meter in response to the second mode;

iii) selectively enabling the current feature set represented by the content of the first MTN register, in response to the content of the first MTN register, when the mode register is in the first mode;

iv) setting the mode register to the second mode in response to a particular first data entry;

v) placing the new meter type number in the second MTN register in response to a second data entry representing the desired new feature set;

vii) calculating an encrypted internally generated configuration enable code whose value depends in a different way on the old and new meter type numbers;

viii) in response to a third data entry representing an externally generated configuration enable code, comparing the internally generated and the externally generated configuration enable codes;

ix) storing the new meter type number in the first MTN register if the meter generated and computer generated configuration enable codes agree; and x) setting the mode register to the first mode if the meter generated and computer generated configuration enable codes agree.

18. The meter of claim 17, and further comprising;

e) a CTID counter; and f) means for incrementing the content of the CTID counter each time the validation means determines the existence of the predetermined relationship.

19. The meter of claim 17 wherein the means is a programmed digital microprocessor.

20. An electronic postage meter having a plurality of software features, the postage meter comprising:

a) first register means for storing a first number representative of a current feature set;

b) means, responsive to the content of the first register means, for selectively enabling the feature set represented by the content of the first register means;

c) second register means for storing an entered second number representative of a desired new feature set;

d) means for generating an internal configuration enable code that depends on at least one of the first and second numbers;

e) means for entering an externally generated configuration enable code;

f) means for comparing the internally generated configuration enable code with the entered configuration enable code; and g) means for placing the second number in the first register means when the internally generated and entered configuration enable codes are the same.

* * * * *